US009165184B2

(12) United States Patent
Sanderson et al.

(10) Patent No.: US 9,165,184 B2
(45) Date of Patent: Oct. 20, 2015

(54) IDENTIFYING MATCHING IMAGES

(75) Inventors: Conrad Sanderson, Eveleigh (AU);
Yong Kang Wong, Eveleigh (AU)

(73) Assignee: IOMNISCIENT PTY LTD., Gordon, NSW (AU)

( * ) Notice: Subject to any disclaimer, the term of this patent is extended or adjusted under 35 U.S.C. 154(b) by 591 days.

(21) Appl. No.: 13/574,555

(22) PCT Filed: Jan. 24, 2011

(86) PCT No.: PCT/AU2011/000071
§ 371 (c)(1),
(2), (4) Date: Jul. 20, 2012

(87) PCT Pub. No.: WO2011/088520
PCT Pub. Date: Jul. 28, 2011

(65) Prior Publication Data
US 2012/0328197 A1    Dec. 27, 2012

(30) Foreign Application Priority Data
Jan. 25, 2010    (AU) ................................. 2010900281

(51) Int. Cl.
*G06K 9/00*    (2006.01)
*G06K 9/62*    (2006.01)
(52) U.S. Cl.
CPC .......... *G06K 9/00288* (2013.01); *G06K 9/6227* (2013.01)
(58) Field of Classification Search
CPC ................................................. G06K 9/6227
See application file for complete search history.

(56) References Cited

U.S. PATENT DOCUMENTS

| 5,842,194 | A | 11/1998 | Arbuckle |
| 6,393,137 | B1 | 5/2002 | Chen et al. |
| 8,441,548 | B1* | 5/2013 | Nechyba et al. ........... 348/222.1 |
| 2004/0228504 | A1* | 11/2004 | Chang ............................ 382/118 |
| 2007/0237396 | A1* | 10/2007 | Wenzel et al. ................ 382/209 |
| 2008/0002913 | A1 | 1/2008 | Vaughn et al. |
| 2008/0211627 | A1* | 9/2008 | Shinzaki ...................... 340/5.82 |
| 2011/0150323 | A1* | 6/2011 | Hancock et al. .............. 382/159 |
| 2012/0268492 | A1* | 10/2012 | Kasahara ..................... 345/633 |

OTHER PUBLICATIONS

Niemeijer et al. (2006) "Image structure clustering for image quality verification of color retina images in diabetic retinopathy screening." Medical Image Analysis, vol. 10 pp. 888-898.*
Wong et al. (2010) "Dynamic amelioration of resolution mismatches for local feature based identity inference." Proc. 2010 IEEE CS Int'l Conf. on Pattern Recognition, pp. 1200-1203.*

(Continued)

*Primary Examiner* — Barry Drennan

(57) ABSTRACT

The disclosure concerns face recognition systems. The aim is to identify candidate matching images to a probe image. There is provided methods, software and computer system to select (22, 24) a method of matching images from two or more methods of matching images based on an underlying resolution (20) of the probe image (8). Comparing two images of differing resolutions is common in surveillance environments. To alleviate this degradation, the method advantageously dynamically selects the most appropriate matching method for a probe image. The disclosure also provided methods to determine the underlying resolution of a probe (8) or gallery image (14).

14 Claims, 6 Drawing Sheets

(56) References Cited

OTHER PUBLICATIONS

R. Gonzales and R. Woods, Digital Image Processing, Prentice Hall, $3^{rd}$ edition, 2007; chapter 8; pp. 524-627.
International Search Report, PCT/AU2011/000071, completion date Apr. 12, 2011; 4 pages.
Written Opinion, PCT/AU2011/000071, completion date Apr. 12, 2011; 6 pages.
P. Belhumeur, J. Hespanha, and D. Kriegman. Eigenfaces vs. fisherfaces: Recognition using class specific linear projection. IEEE Trans. Pattern Anal. Mach. Intell., 19(7):711-720,1997.
K. Bowyer. Face recognition technology: Security vs privacy. IEEE Technology and Society Magazine, 23(1):9-19, 2004.
F. Cardinaux, C. Sanderson, and S. Bengio. User authentication via adapted statistical models of face images. IEEE Trans. Signal Processing, 54(1):361-373, 2006.
G. B. Huang, M. Ramesh, T. Berg, and E. Learned-Miller. Labeled Faces in the Wild: A database for studying face recognition in unconstrained environments. University of Massachusetts, Amherst, Technical Report 07-49, Oct. 2007.
E. Nowak, F. Jude, and B. Triggs. Sampling strategies for bagof-features image classification. In European Conf. Computer Vision (ECCV), Part IV, Lecture Notes in Computer Science (LNCS), vol. 3954, pp. 490-503, 2006.

Ahmed, N., Natarajan, T. and Rao, K. Discrete Cosine Transform. IEEE Transactions on computers. Jan. 1974.
Y. Rodriguez, F. Cardinaux, S. Bengio, and J. Mariethoz. Measuring the performance of face localization systems. Image and Vision Comput., 24:882-893, 2006.
C. Sanderson and B. C. Lovell. Multi-region probabilistic histograms for robust and scalable identity inference. In Int. Conf. Biometrics (ICB), Lecture Notes in Computer Science (LNCS), vol. 5558, pp. 199-208, 2009.
Feng, Q., Han, K. and Zhu, X. A New Auto-focusing Method Based on the Centre Blocking DCT. Proceedings of the Fourth International Conference on Image and Graphics, pp. 32-38, IEEE Computer Society Washington DC, USA, 2007.
Marichal, X., Wei-Ying M. and Zhang, H . Blur Determination in the Compressed Domain Using DCT Information. Proceedings 1999 International Conference on Image Processing, pp. 386-390 vol. 2, Kobe, 1999.
X.Lu, "Image Analysis for Face Recognition", https://www.msu.edu/~lvxiaogu/publications/ImAna4FacRcg_Lu.pdf. 2003.
Park, U. Face Recognition: Faces in Video, Age Invariance, and Facial Marks, http://biometrics.cse.msu.edu/Publications/Thesis/UnsangFaceRec_PhD09.pdf, 2009.

\* cited by examiner

| Underlying Resolution | Size A | Size B |
|---|---|---|
| 64 × 64 | 99.87 % | 0.13 % |
| 32 × 32 | 98.06 % | 1.94 % |
| 16 × 16 | 1.94 % | 98.06 % |
| 8 × 8 | 0.00 % | 100.00 % |

Fig. 4

| Underlying Resolution | System A | System B | Dynamic System |
|---|---|---|---|
| 64 × 64 | 74.25 % | 70.28 % | 74.35 % |
| 32 × 32 | 70.36 % | 69.99 % | 70.47 % |
| 16 × 16 | 59.35 % | 68.08 % | 67.62 % |
| 8 × 8 | 53.13 % | 59.40 % | 59.90 % |
| Average | 64.27 % | 66.94 % | 68.09 % |

Fig. 5

IDENTIFYING MATCHING IMAGES

TECHNICAL FIELD

The disclosure concerns identifying candidate matching images to a probe image, such as in face recognition systems. In particular, but not limited to, the disclosure concerns matching images having different resolutions. Aspects include methods, computer systems and software.

In this specification "underlying resolution" is taken to mean the inherent resolution or quality of the image, which is the amount of specific detail/optical information in the image. It represents the finest detail discernable in the image. It is not to be understood as a measure of the file size of the image or dots per inch (DPI) of the image. The size of the image file is not by itself a suitable measure of underlying resolution, for example, the image may have poor optics or features in the image may not be discernable.

In this specification, the plural form should be understood, when appropriate, to mean either singular or plural.

BACKGROUND

The process performed by a typical face recognition system is shown in FIG. 1. The aim is to identify the person whose face is represented in the probe image 8 by comparing the probe image to a set of gallery images 14. Each image in the set of gallery images 14 includes the face of a person whose identity is known.

The size of the probe image 8 and gallery images 14 must be the same prior to feature extraction [3]. As such, the images are normally resized during pre-processing 10 to a common intermediate format (IF) size (e.g. small sized images are up-scaled to this IF size while large sized images are downscaled to this IF size).

The face matching method is previously tuned to work with that particular IF image size. Then this face matching method 12 is applied to each probe image 8 by comparison to each of the gallery images 14 to identify candidate matching images in the set of gallery images 14.

Face matching methods can be placed into two general families: holistic and local-feature based. In typical holistic methods, a single feature vector describes the entire face and the spatial relations between face characteristics (e.g. eyes) are rigidly kept. Examples of such systems include PCA and Fisherfaces [2]. In contrast, local-feature based methods describe each face as a set of feature vectors (with each vector describing a small part of the face), with relaxed constraints on the spatial relations between face parts [4]. Examples include systems based on elastic graph matching, hidden Markov models (HMMs) and Gaussian mixture models (GMMs) [4].

Local-feature based methods have the advantage of being considerably more robust against misalignment as well as variations in illumination and pose [4, 11]. As such, face recognition systems using local-feature based approaches are more suitable for dealing with faces obtained in surveillance contexts.

Post processing 16 is then performed on the results of the face matching method 12 such as referencing details of the people that were identified as candidate matches from an external database (not shown).

Finally, the likely identity information 18 of the candidate match(es) from the set of gallery images 14 are presented to the user.

The use of IF processing in typical face recognition systems leads to disadvantages in mismatched resolution comparisons which include:
  (i) For images with low underlying resolution, upscaling does not introduce any new information, and can potentially introduce artifacts or noise. Also, upscaled images are blurry, which causes the extracted features to be very different than those obtained from the downscaled faces with high underlying resolution, resulting in a significant drop in recognition accuracy.
  (ii) Downscaling reduces the amount of information available, thereby reducing the performance of the face matching method.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

In a first aspect a method is provided for identifying candidate matching images to a probe image, comprising:
  based on an underlying resolution of the probe image, selecting a method of matching images from two or more methods of matching images; and
  performing the selected method on the probe image and a set of gallery images to identify in the set of gallery images candidate matching images to the probe image.

While some face recognition systems are robust to issues such as misalignment, they can exhibit accuracy degradation when comparing two images of differing resolutions. Comparing two images of differing resolutions is common in surveillance environments where a gallery of high resolution mug-shots is compared to low resolution CCTV probe images.

To alleviate this degradation, the method advantageously dynamically selects the most appropriate matching method for a probe image. This allows the overall method to be tuned to work well for both high and low resolution images and new matching methods can be incorporated to enhance the accuracy of the overall method. The method of dynamically selecting the most appropriate matching method does not add much computational overhead meaning the overall method can remain fast and scalable.

The probe and set of gallery images may be images representative of people's faces.

The method of matching images may be a local-feature based or a holistic based method.

The method may comprise determining the underlying/actual resolution of the probe image. Determining the underlying resolution of the image may comprise accessing a previously determined underlying resolution or calculating the underlying resolution as required. Determining the underlying resolution of the probe image may comprise selecting one of multiple resolution bands that the probe image belongs to, such as a high or low resolution band.

Determining the underlying resolution of the probe image may comprise comparing the probe image to two or more sets of reference images, where for each set of reference images the underlying resolution of all the images of that set are substantially the same. Determining the underlying resolution of the probe image may be based on which set of reference images the probe image is most similar to, and determining (i.e. classifying) the underlying resolution of the probe image may be similar to the resolution of the images in that set of reference images.

Determining the underlying resolution of the probe image may comprise determining an energy of the probe image based on a discrete cosine transformation of the probe image.

The method may further comprise determining the underlying resolution of images in the set of gallery images.

Selecting the method of matching images may be further based on the underlying resolution of the images in the set of gallery images.

Selecting the method of matching images may be performed for each gallery image in the set of gallery images, and selecting the method of matching images for a gallery image is based on the underlying resolution of that gallery image. Performing the selected method may comprise performing the method of matching images selected for that gallery image on the probe image and that gallery image to determine whether that gallery image is a candidate matching image to the probe image.

That is, the method of matching images selected for a first and second gallery image may be different if the underlying resolutions of the first and second gallery images are different.

Selecting a method of matching images may include tuning a matching method to be most suited to the underlying resolution of the probe image and/or the gallery image.

Where the set of gallery images includes two or more images of an item, the selected method may comprise selecting from the set of gallery images the image of that item having the optimal underlying resolution for the selected method and performing the selected method on only that image of the item of the two or more images of the item.

The method of matching images may be a Multi Region Histogram (MRH) analysis [12].

Determining the underlying resolution may comprise classifying the underlying resolution as one of two or more resolution bands, each band having a corresponding method of matching images, and selecting a method of matching images comprises selecting the method of matching images corresponding to the resolution band of the probe image.

The determined underlying resolution may be either a high resolution or a low resolution, wherein the boundary between the high and low resolution is dependent on a predetermined underlying resolution or underlying resolution of the image in the set of gallery images that the selected method of matching images is to be performed on. Two indeterminate formats may be used, one being higher than the other, such that if the underlying resolution of the probe image is determined as being a high resolution, the selected method comprises converting the probe image to the higher intermediate format. Alternatively, if the resolution of the probe image is determined as being a low resolution, the selected method comprises converting the probe image to the lower intermediate format.

In a second aspect, software is provided, that when installed on a computer system causes it to perform the method of any one of the preceding claims.

In a third aspect, a computer system is provided for identifying candidate matching images to a probe image comprising:
   memory to store a set of gallery images,
   a method selector to select a method of matching images from two or more methods of matching images based on an underlying resolution of the probe image; and
   a matching module to perform the selected method on the probe image and the set of gallery images to identify candidate matching images to the probe image in the set of gallery images.

The computer system of the second aspect may further comprise an underlying resolution detector to determine the underlying resolution of the probe image.

Optional features of this computer system are the same as the optional features of the method of the first aspect described above.

In a fourth aspect, a method for determining an underlying resolution of an image is provided, comprising:
   comparing the image to two or more sets of reference images, where for each set of reference images, the underlying resolution of all the images of that set are substantially the same;
   determining which of the set of images the probe image is most similar to, and selecting the underlying resolution of images in that set of reference images as being the underlying resolution of the probe image.

An image may be most similar to the set if the average distance to the images in that set is the shortest.

In a fifth aspect, software is provided, that when installed on a computer system causes it to perform the method of the fourth aspect.

In sixth aspect, the invention provides a resolution detector that is operable to perform the method of the fourth aspect, such as a resolution detector of the third aspect.

In a seventh aspect, a method for determining an underlying resolution of an image is provided, comprising:
   determining weights of cosine functions oscillating at different frequencies based on two dimensional discreet cosine transformation of the image;
   determining a total sum of each weight for the image;
   determining a part sum of weights for a predetermined proportion or number of different frequencies, starting with substantially the lowest frequency to higher frequency;
   determining the proportion the part sum is of the total sum; and
   comparing the proportion to a predetermined threshold, the threshold being indicative of underlying resolution of the image.

In a eighth aspect, software is provided, that when installed on a computer system causes it to perform the method of the seventh aspect.

In a ninth aspect, a resolution detector is provided that is operable to perform the method of the seventh aspect, such as a resolution detector of the third aspect.

In a tenth aspect, a method for identifying candidate matching images described above, wherein determining the resolution of the probe image is performed according to one of the methods of the fourth or seventh aspects.

Figure 1:
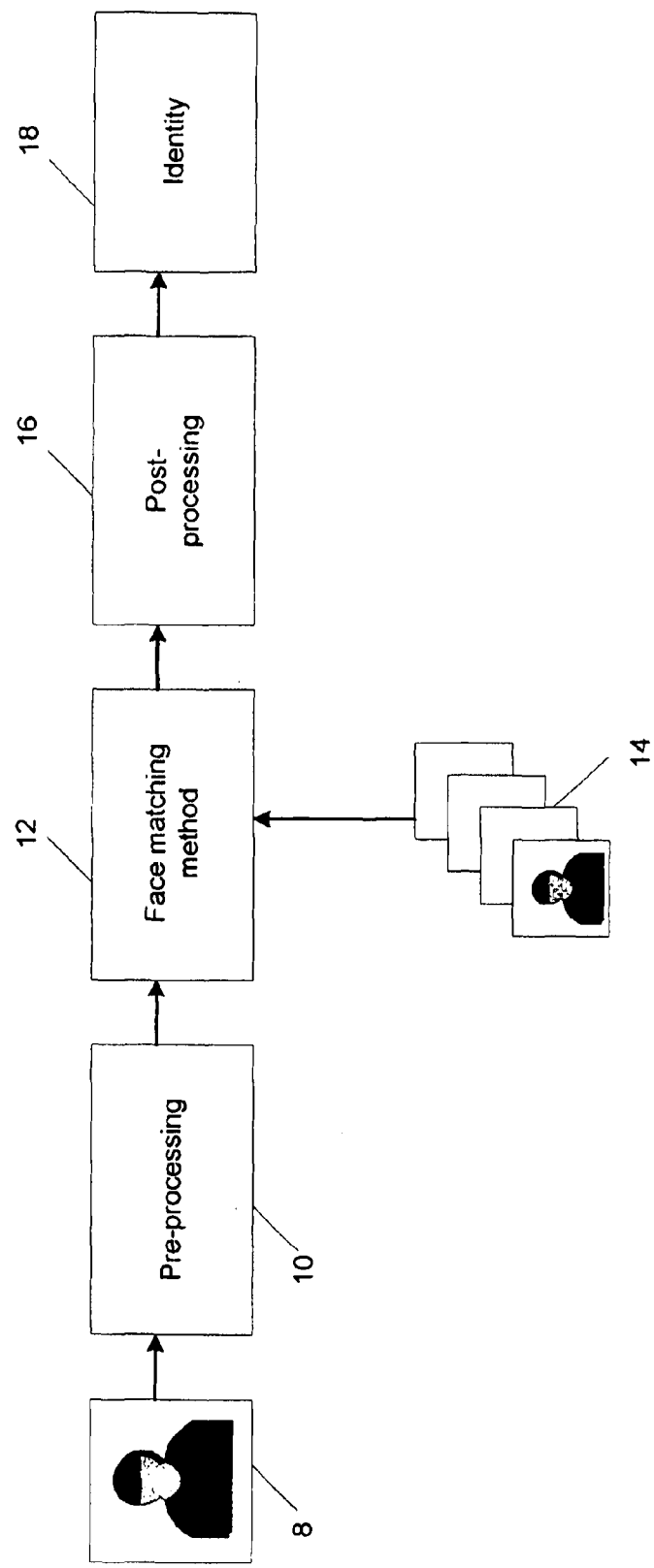
FIG. 1 is a flow chart of the steps performed by a typical face recognition system.
Figure 2:
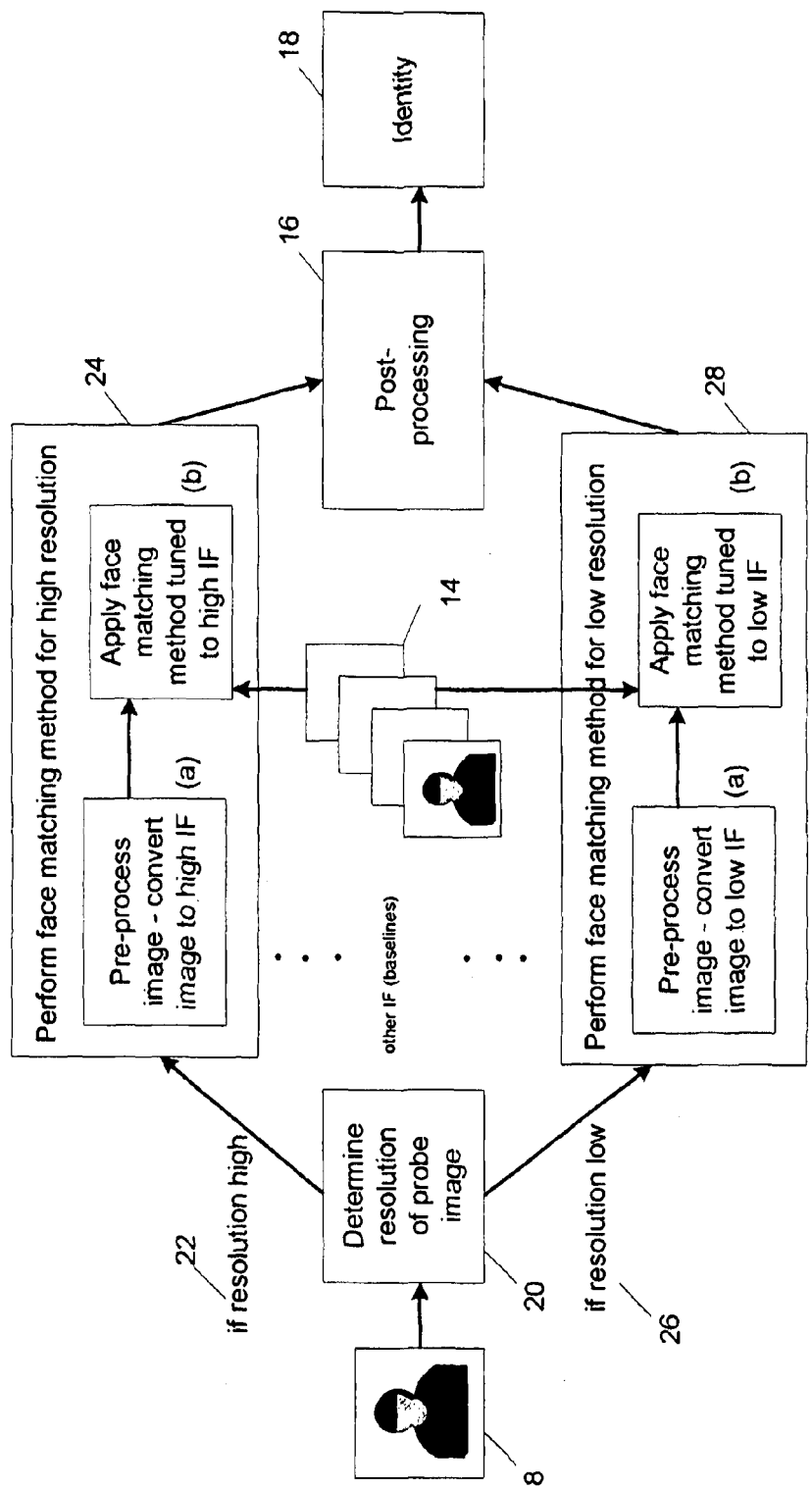
Figure 3:
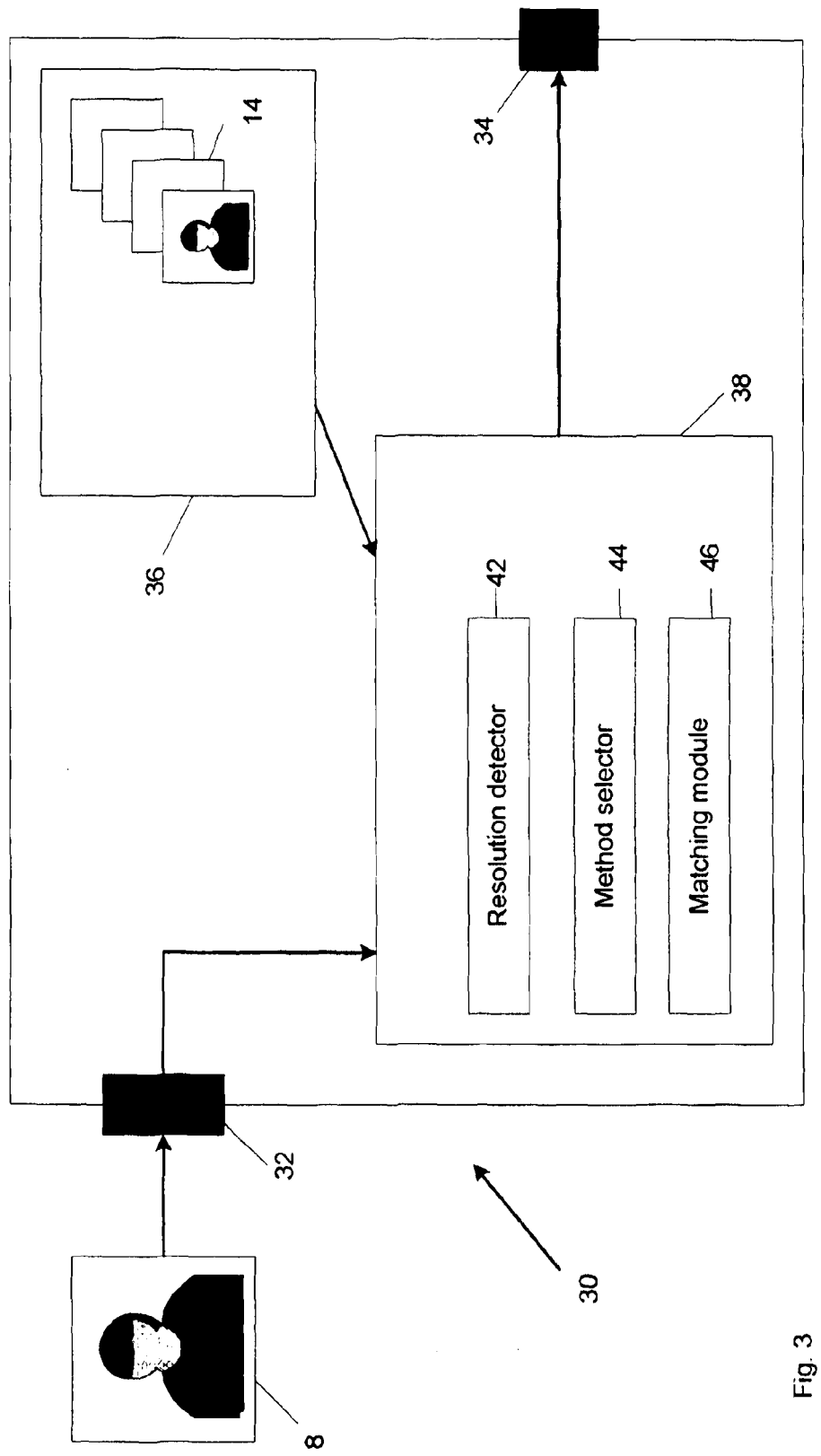
Figure 6:
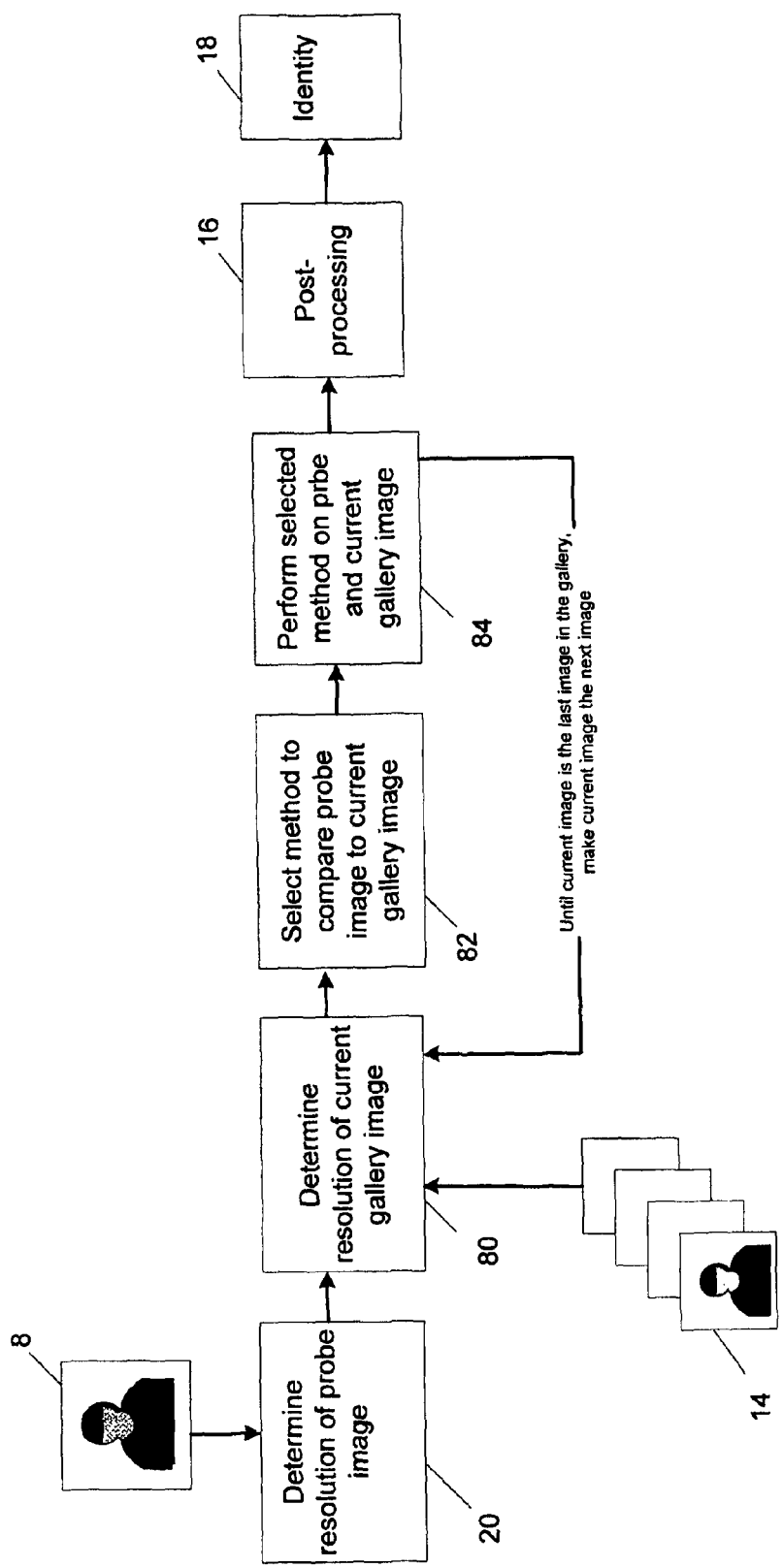

Examples will now be described with reference to an accompanying drawings, in which:

FIG. 2 is a flow chart of the steps performed by a face recognition system of a first example;

FIG. 3 is a schematic diagram of a computer system to perform the method shown in FIG. 2;

FIGS. 4 and 5 are tables showing comparative results of an implementation of the first example; and FIG. 6 is a flow chart of the steps performed by a face recognition system of a second example.

In the drawings and description below, like reference numbers have been used to represent the same features.

BEST MODES

Example 1

Mismatched underlying resolutions between probe and gallery images can cause significant performance degradation for face recognition systems, particularly those which use high-resolution faces (e.g. mugshots or passport photos) as gallery images.

Another source of underlying resolution mismatches is due to the fact that the size (in terms of pixels) of a given face image may not be a reliable indicator of the underlying optical resolution. For example poor quality optics in low-cost cameras can act as low-pass filters. Also poor focus and overexposure can result in blur and loss of detail. In the act of resizing, typical local feature based recognition approaches pre-suppose that the original sizes of the given images are an indicator of the underlying resolutions. Situations can arise where the given probe face image has an underlying resolution larger than the resolution that can be captured in the IF image size (e.g. such as probe images obtained through a telephoto lens).

To allow maximum accuracy wherever possible, the face recognition system of this first example is able to classify those situations in which a method using high-to-high resolution comparison is possible (i.e. using a larger IF) and when a method using a low-to-high resolution face comparison (i.e. using a smaller IF size).

In this first example, the face recognition system can handle resolution mismatches for the recently proposed Multi-Region Histograms (MRH) local-feature face matching method. In this example:
  (i) the use of two IF sizes (small and large), with the small IF size targeted for reducing resolution mismatches caused by upscaling the probe image (and this possibly introducing noise and/or artifacts), and the large IF size targeted for high discrimination performance when little to no resolution mismatches are present;
  (ii) a dedicated underlying resolution detector frontend to address situations where the actual underlying resolution of given faces is unknown (i.e. where the size of given images cannot be relied upon to determine the resolution);
  (iii) to employ the underlying resolution detector, as part of a resolution mismatch compensation framework, to determine which of the two IF image sizes to use when comparing two face images with unknown resolutions.

The method performed by the face recognition system of this example will now be described with reference to the flow chart of FIG. 2.

In this first example the resolution of images in the set of gallery images is already known and is the same for each image. The size of each of the images in the set of gallery images is 64×64 and the underlying resolution of each of the images is proportional to this image size (i.e. there is no noise in the image).

A probe image 8 is received and a underlying resolution detector operates to determine 20 the resolution of this probe image 8.

In this first example, all the possible probe images 8 are the same size (64×64) but the underlying (e.g. actual) resolutions are not the same.

In order to handle resolution mismatches when the size of given probe image 8 cannot be relied upon as an indicator of the underlying resolution, the content of the given image is analysed to determine whether the images can be downscaled to a more appropriate size (i.e. according to a preferred selected method). In this example there are one of two methods available to determine the underlying resolution of the probe image:

(1) Classify Resolution Using Cohorts

This method has two sets of cohort images (reference face images). One set has high resolution images $S_A$ and the second set has low resolution images $S_B$. The resolution detector measures whether the probe image Q is more similar to either low resolution cohort images $S_A$ or high-resolution cohort images $S_B$.

This similarity is measured as a "distance", and the average distance of the probe image Q to images in sets $S_A$ and $S_B$ is found:

$$d_{avg}(Q, S_i) = |S_i|^{-1} \sum_{j=1}^{|S_i|} d_{raw}(Q, S_{i,j}) \quad (5)$$

where $i \in \{A, B\}$, $S_{i,j}$ is the j-th face of set $S_i$ and $|S_i|$ is the number of faces in set $S_i$. In equation (5), $d_{raw}$ is the match distance between the probe and individual images in set $S_i$. That match distance (also known as similarity distance) is dependent on the matching algorithm. MRH is an example of one such matching algorithm [12].

The smallest average distance $d_{avg}(Q, S_A)$ or $d_{avg}(Q, S_B)$ is determined. If the distance to $S_B$ is shorter that the distance to $S_A$, it is determined that the probe image is low resolution, otherwise it is determined that it the is a high resolution probe image.

(2) Classify Resolution Using Energy Information

This energy-based method analyses the amount of energy within a subset of frequency domain.

First, a 2 Dimensional (2D) Discrete Cosine Transform (DCT) analysis on the whole probe image (i.e. holistic face) is performed. The 2D DCT analysis extracts a set of coefficients, or weights, of cosine functions oscillating at different frequencies.

Next, the absolute value of the coefficients are summed to get a total "energy" normaliser. Then sum coefficients from low frequency to high frequency are also summed and divided over the total "energy" to get the cumulative percentage of total energy up to a particular frequency.

This cumulative percentage of total energy level is compared to a predetermined threshold. For example, summing the first 25% of the low frequency domain can give an indication of the underlying resolution of a given image.

That is, if the energy within the first 25% of the low frequency coefficients is more the threshold T, the image can be classified as containing low underlying resolution In this example, the method used to determine the underlying resolution of the probe image is the cohort-based method (method 1 listed above), with the value of $d_{raw}$ being obtained through the MRH face matching method.

The MRH-based face matching method is now briefly described. The MRH local-feature face matching method can be thought of as a hybrid between the HMM and GMM based systems [12]. The MRH approach is motivated by the 'visual words' technique originally used in image categorisation [10]. Each face is divided into several fixed and adjacent regions, with each region comprising a relatively large part of the face. For region r a set of feature vectors is obtained, $F_r=\{f_{r,i}\}_{i=1}^{N}$, which are in turn attained by dividing the region into small overlapping blocks (or patches) and extracting descriptive features from each block via 2D DCT decomposition [6]. Each block has a size of 8×8 pixels, which is the typical size used for DCT analysis. To account for varying contrast, each block is normalised to have zero mean and unit variance. Based on [12], coefficients from the top-left 4×4 sub-matrix of the 8×8 DCT coefficient matrix are used, excluding the 0-th coefficient (which has no information due to the normalisation).

For each vector $f_{r,i}$ obtained from region r, a probabilistic histogram is computed:

$$h_{r,i} = \left[\frac{w_1 p_1(f_{r,i})}{\sum_{g=1}^{G} w_g p_g(f_{r,i})}, \ldots, \frac{w_G p_G(f_{r,i})}{\sum_{g=1}^{G} w_g p_g(f_{r,i})}\right]^T \quad (1)$$

where the g-th element in $h_{r,i}$ is the posterior probability of $f_{r,i}$ according to the g-th component of a visual dictionary model. The mean of each Gaussian can be thought of as a particular 'visual word'.

Once the histograms are computed for each feature vector from region r, an average histogram for the region is built:

$$h_{r,avg} = \frac{1}{N}\sum_{i=1}^{N} h_{r,i} \quad (2)$$

The overlapping during feature extraction, as well as the loss of spatial relations within each region (due to averaging), results in robustness to translations of the face which are caused by imperfect face localisation. The DCT decomposition acts like a low-pass filter, with the information retained from each block being robust to small alterations (e.g. due to minor in-plane rotations).

The normalised distance between faces X and Y is calculated using:

$$d_{norm}(X, Y) = \frac{d_{raw}(X, Y)}{\frac{1}{2M}\sum_{i=1}^{M}\{d_{raw}(X, C_i) + d_{raw}(Y, C_i)\}} \quad (3)$$

where $C_i$ is the i-th cohort face and M is the number of cohorts, while $d_{raw}(\cdot,\cdot)$ is a $L_1$-norm based distance measure between histograms from R regions:

$$d_{raw}(X, Y) = \frac{1}{R}\sum_{r=1}^{R} \|h_{r,avg}^{[X]} - h_{r,avg}^{[Y]}\|_1 \quad (4)$$

See [12] for more information about equations (3) and (4).

Cohort faces are assumed to be reference faces that are known not to be of persons depicted in X or Y. The denominator in Eqn. (3) estimates how far away, on average, faces X and Y are from a randomly selected face. This typically results in Eqn. (3) being approximately 1 when X and Y represent faces from two different people, and less than 1 when X and Y represent two instances of the same person.

Next, the best matching method is performed on the probe image 8. If the resolution of the probe image is classified as high 22 then the method of matching images 24 that has superior performance on such high resolution probe images is selected. In this example, the method 24 is MRH tuned for high resolution images, that is, it is trained on a set of high resolution images with a similarly high IF (i.e. an IF size that is sufficiently large enough to capture the detail of probe images classified as high resolution) to learn a model. The probe image 8 is first converted to the size of the a high IF 24(a) being 64×64 in this example and then MRH tuned to high resolution images is performed 24(b).

If the resolution of the probe image is low 26 then the method of identifying matching images 28 that has superior performance on such low resolution probe images is selected. In this example, the method 26 is MRH tuned for low resolution images, that is, it is trained on a set of low resolution images with lower IF to learn a model. The probe image 8 is first converted to an low IF (i.e an IF size that is sufficiently large enough to capture the detail of probe images classified as low resolution but is smaller than the large IF size) 28(a) being 32×32 in this example and then MRH tuned to low resolution images is performed 28(b).

In this example, the boundary that defines a high and low resolution is predetermined and remains the same for all probe images 8 that are assessed. Alternatively, the boundary between the high and low images may be dependent on the resolution of all the images in the gallery or may be adjusted based on the image in the gallery that the selected method will be performed next.

In an alternate embodiment, where there are multiple faces of a person in the set of gallery images, the selected method may also comprise selecting from the multiple faces of the same person the image of that person having the best resolution for the comparison. For example, it may select the image of the person in the gallery that has a resolution most similar to the probe resolution. After which the face recognition method most suitable (i.e. using the smallest IF size that is able to capture this resolution) will be applied for the comparison.

Due to the low-pass filtering effect of the DCT analysis, MRH-based recognition tuned for high resolution (where all given images are resized to high IF of 64×64) is able to handle images which have a high underlying resolution of 32×32 or higher, while MRH-based recognition tuned for low underlying resolution (where all images are resized to low IF of 32×32) is more suited for lower resolutions. This results in the sensitivity of local DCT features to resolution mismatches being exploited.

Post-processing 16 and identity steps 18 are then performed.

Additional pre-processing steps (not shown) may be performed before or after the resolution is detected as appropriate. For example, cropping the probe image 8.

FIG. 3 shows a computer face recognition system 20 that is able to perform the method of FIG. 2. The computer system 30 comprises an input port 32, an output port 34, internal memory 36 and a processor 38. The internal memory stores the gallery of images 14 and the associated resolution and identity information of the person represented in each image. The processor 38 is comprised of a resolution detector 42, a matching method selector 44 and matching module 46.

The probe image 8 is received at the input port 32 and the processor 38 operates according to software installed on the computer 30 to cause the resolution detector 42 to determine the resolution of the probe image (and in example two below the resolution of each gallery image). The method selector 44 then uses the determined resolution to select the most appropriate method of matching images 24 or 28. These methods 24 and 28 are available to the matching module 46 that performs the selected method 24 or 28. The processor 38 then provides the result of the matching method to the output port 34. For example, the output port may be connected to a monitor (not shown) and the processor 38 may also drive a user interface to display the candidate matches from the set of gallery images to the user.

In this implementation the set of gallery images is the Labeled Faces in the Wild (LFW) dataset which contains 13,233 face images (from 5749 unique persons) collected from the Internet [8]. The faces exhibit several compound problems such as misalignment and variations in pose, expression and illumination.

Initially a pre-processing step is performed where closely cropped faces (to exclude the background) were extracted from each image using a fixed bounding box placed in the same location in each LFW image. These extracted images were used in this implementation.

The aim is to classify a pair of previously unseen faces as either belonging to the same person or two different persons [8]. Performance is indicated by the mean of the accuracies from 10 folds of the 10 sets from view 2 as described in the LFW experiment protocol [8], in a leave-one-out cross-validation scheme (i.e. in each fold 9 sets are used for training and 1 set for testing, with each set having 300 same-person and 300 different-person pairs).

To study the effect of resolution mismatches, the first image in the each pair was rescaled to 64×64 while the second image was first rescaled to a size equal to or smaller than 64×64, followed by up-scaling to the same size as the first image (i.e. deliberate loss of information, causing the image size to be uninformative as to the underlying resolution). The underlying resolution of the second image varied from 8×8 to 64×64.

In implementation 1 we evaluated the classification performance of the proposed resolution detector frontend. Reference faces for sets $S_A$ and $S_B$ were taken from the training set. Preliminary experiments indicated that using 32 faces for each reference set was sufficient. The second image in each pair from the test set was then classified as being suitable for MRH-based face recognition using either size A or B. Recall that an MRH-based face recognition system tuned for size A is suited for faces which have an underlying resolution of 32×32 or higher, while a corresponding system tuned for size B is more suited for lower resolutions. The results, shown in Table 1 of FIG. 4, indicate that the frontend detector is able to assign the most suitable size almost perfectly.

In implementation 2 we evaluated the performance of three MRH-based systems for classifying LFW image pairs subject to resolution mismatches. Matching methods A and B were tuned for size A and B, respectively, while the dynamic system 44 applies the proposed compensation framework to switch between methods A and B according to the classification result of the resolution detector 42.

Comparing the results of the two baseline systems (A and B) in Table 2 of FIG. 5 confirms that System A outperforms System B when matching images of similar underlying resolution (i.e. 64×64 and 32×32), but significantly underperforms System B when there is a considerable resolution mismatch (16×16 or lower). System B is able to achieve more rounded performance at the expense of reduced accuracy for the highest resolution (64×64).

The proposed dynamic system is able to retain the best aspect of system A (i.e. good accuracy at the highest resolution) with performance similar to system B at lower resolutions. Consequently, the dynamic system of the example obtains the best overall performance.

The two systems (A and B) were tuned to different underlying resolutions. System A, tuned for underlying resolutions of 32×32 and higher sizes, was shown to outperform System B when being compared to images of similar underlying resolution, while underperforming when comparing images of very different underlying resolution (16×16 and 8×8). The reverse was true for System B, tuned for lower resolutions. The dynamic face recognition system of this example is able to maximise performance by applying the face matching method best tuned for any given pair of images based on their underlying resolutions.

This examples shows that higher overall face discrimination accuracy (across several resolutions) compared to the individual baseline face recognition systems.

It is an advantage of this example that the face recognition system can handle both high-to-high and low-to-high resolution comparisons. The face recognition system of this example is able to retain the best aspect of system A (i.e. good accuracy at the highest resolution) with performance similar to system B at lower resolutions. Consequently, the dynamic system obtains the best overall performance.

Example 2

A further example of the invention will now be described with reference to the flow chart of FIG. 6. It should be appreciated that the computer system shown in FIG. 3 is also suitable to perform the method of this second example.

In this example, the underlying resolution of the images in the set of gallery images is not yet known. In fact, the gallery includes images having different resolutions, such mug shots of high resolution as well as low resolution CCTV images. As part of a pre-processing step the underlying resolution of each of the gallery images is determined and is stored in memory.

The underlying resolution of the probe image 8 is determined 20.

Then the resolution of the current gallery image is determined 80. Initially, this will be the first image in the gallery. In one example, the resolution of the current image in the gallery is obtained from memory. Alternatively, the resolution of the first gallery image could be determined by analysing 20 the current gallery image in the same way as the resolution of the probe image 8 was determined.

Then, the resolution of that gallery image and the probe image is assessed to select 82 the optimal face matching method to be used to compare the current gallery image and the probe image to determine whether the gallery image is a candidate match.

In this second example, where the resolution of the probe image is similar to the resolution of the current gallery image, then the matching method of Fisherfaces (LDA), Eigenfaces (PCA), MRH with IF tuned to that resolution (i.e. a image size that can capture that resolution), or a number of other methods can be selected. Alternatively, if the resolution of the probe image is not similar to the resolution of the current gallery image, the method of MRH with downscaling and IF tuned to the lower resolution image, or simultaneous super-resolution image reconstruction and recognition is selected. Alternatively, the number of different methods of identifying candidate matching images may be more than two and may be specific to the particular combination of probe and gallery image resolutions that are to be compared. The aim is that the method for any combination of resolutions will be optimal for that combination.

Then the probe image and current gallery image are compared 84 using the selected matching method to determine whether they are a candidate match.

Steps 80, 82 and 84 are repeated for each image of the gallery, at every repeat the next gallery image is used until there are not more images in the gallery. That is, for each repeat the current image becomes the next image in the gallery that has not yet been analysed.

Again, post-processing 16 and identity 18 steps are performed.

It will be appreciated by persons skilled in the art that numerous variations and/or modifications may be made to the invention as shown in the specific embodiments without departing from the scope of the invention as broadly described.

In the first example, the resolution of the probe image was classified as either high or low. Alternatively, the resolution of the probe image can be classified into one of three of more resolution bands and each resolution band having an associated matching method that can be optimally deployed for that resolution. For example, three or more IFs may be used by the face recognition system.

The examples described here relate to face recognition, however the method may be applied to different types of images where candidate matches between a probe image and a set of gallery images is required to be identified. Such as images representing materials or animals.

It should be understood that the techniques described here might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media (e.g. copper wire, coaxial cable, fibre optic media). Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

REFERENCES

[2] P. Belhumeur, J. Hespanha, and D. Kriegman. Eigenfaces vs. fisherfaces: Recognition using class specific linear projection. IEEE Trans. Pattern Anal. Mach. Intell., 19(7): 711-720,1997.

[3] K. Bowyer. Face recognition technology: Security vs privacy. IEEE Technology and Society Magazine, 23(1):9-19, 2004.

[4] F. Cardinaux, C. Sanderson, and S. Bengio. User authentication via adapted statistical models of face images. IEEE Trans, Signal Processing, 54(1):361-373, 2006.

[6] R. Gonzales and R. Woods. Digital Image Processing. Prentice Hall, 3rd edition, 2007.

[8] G. B. Huang, M. Ramesh, T. Berg, and E. Learned-Miller. Labeled Faces in the Wild: A database for studying face recognition in unconstrained environments. University of Massachusetts, Amherst, Technical Report 07-49, October, 2007.

[10] E. Nowak, F. Jurie, and B. Triggs. Sampling strategies for bagof-features image classification. In European Conf. Computer Vision (ECCV), Part IV, Lecture Notes in Computer Science (LNCS), volume 3954, pages 490-503,2006.

[11] Y. Rodriguez, F. Cardinaux, S. Bengio, and J. Mariethoz. Measuring the performance of face localization systems. Image and Vision Comput., 24:882-893, 2006.

[12] C. Sanderson and B. C. Lovell. Multi-region probabilistic histograms for robust and scalable identity inference. In Int. Conf. Biometrics (ICB), Lecture Notes in Computer Science (LNCS), volume 5558, pages 199-208,2009.

The invention claimed is:

1. A method for identifying candidate matching images to a probe image, comprising:
based on an underlying resolution of the probe image, selecting a method of matching images from two or more methods of matching images;
performing the selected method on the probe image and a set of gallery images to identify in the set of gallery images candidate matching images to the probe image; and
determining an underlying resolution of the probe image by determining energy of the probe image based on a discrete cosine transformation of the probe image.

2. The method of claim 1, wherein the probe and set of gallery images are images representative of people's faces.

3. The method of claim 1, wherein determining the underlying resolution of the probe image comprises comparing the probe image to two or more sets of reference images, where for each set of reference images, the underlying resolution of all the images of that set are substantially the same.

4. The method of claim 3, wherein determining the underlying resolution of the probe image is based on which of the sets of reference images the probe image is most similar to, and determining that the underlying resolution of the probe image is similar to the underlying resolution of the images in that set of reference images.

5. The method of claim 1, wherein selecting the method of matching images is performed for each gallery image in the set of gallery images, and selecting the method of matching images for a gallery image is further based on the underlying resolution of that gallery image.

6. The method of claim 1, wherein determining the underlying resolution of the probe image comprises classifying the underlying resolution as one of two or more underlying resolution bands.

7. The method of claim 1, wherein the underlying resolution of the probe image is either a high underlying resolution or a low underlying resolution, wherein the boundary between the high and low resolution is dependent on a predetermined underlying resolution or underlying resolution of the gallery image in the set of gallery images that the selected method of matching images is to be performed on.

8. The method of claim 7, wherein two intermediate formats are used, one intermediate format being higher in underlying resolution than the other, such that if the underlying resolution of the probe image is a high underlying resolution, the selected method comprises converting the probe image to the intermediate format having the higher underlying resolution.

9. The method of claim 7 or 8, wherein two intermediate formats are used, one intermediate format being higher in underlying resolution than the other, such that if the resolution of the probe image is a low underlying resolution, the selected method comprises converting the probe image to the intermediate format having the lower underlying resolution.

10. The method of claim 1, wherein the method comprises determining the underlying resolution of the probe image by:
   comparing the probe image to two or more sets of reference images, where for each set of reference images, the underlying resolution of all the images of that set are substantially the same; and
   determining which of the sets of reference images the probe image is most similar to, and selecting the underlying resolution of images in that set of reference images as being similar to the underlying resolution of the probe image.

11. The method of claim 1, wherein the method comprises determining the underlying resolution of the probe image by:
   determining weights of cosine functions oscillating at various frequencies based on two dimensional discrete cosine transformation of the probe image;
   determining a total sum of each weight for the probe image;
   determining a part sum of weights for a predetermined proportion or number of different frequencies, starting with substantially the lowest frequency to higher frequency;
   determining the proportion the part sum is of the total sum; and
   comparing the proportion to a predetermined threshold, the threshold being indicative of underlying resolution of the probe image.

12. A computer system for identifying candidate matching images to a probe image comprising:
   memory to store a set of gallery images;
   a method selector to select a method of matching images from two or more methods of matching images based on an underlying resolution of the probe image;
   a matching module to perform the selected method on the probe image and the set of gallery images to identify in the set of gallery images candidate matching images to the probe image; and
   an underlying resolution detector to determine the underlying resolution of the probe image, the underlying resolution detector operable to determine weights of cosine functions oscillating at various frequencies based on two dimensional discreet cosine transformation of the probe image, determine a total sum of each weight for the probe image, determine a part sum of weights for a predetermined proportion or number of different frequencies, starting with substantially the lowest frequency to higher frequency, determine the proportion the part sum is of the total sum, and compare the proportion to a predetermined threshold, the threshold being indicative of underlying resolution of the probe image.

13. The computer system of claim 12, wherein the underlying resolution detector is operable to:
   compare the probe image to two or more sets of reference images, where for each set of reference images, the underlying resolution of all the images of that set are substantially the same; and
   determine which of the sets of reference images the probe image is most similar to, and selecting the underlying resolution of images in that set of reference images as being similar to the underlying resolution of the probe image.

14. A method for determining an underlying resolution of an image, comprising:
   determining weights of cosine functions oscillating at various frequencies based on two dimensional discrete cosine transformation of the image;
   determining a total sum of each weight for the image;
   determining a part sum of weights for a predetermined proportion or number of different frequencies, starting with substantially the lowest frequency to higher frequency;
   determining the proportion the part sum is of the total sum; and
   comparing the proportion to a predetermined threshold, the threshold being indicative of underlying resolution of the image.

\* \* \* \* \*